US012614055B2

(12) United States Patent
Mao et al.

(10) Patent No.: US 12,614,055 B2
(45) Date of Patent: Apr. 28, 2026

(54) DUAL-CARRIER-POWERED RFID TAG CIRCUIT AND DATA TRANSCEIVING METHOD

(71) Applicant: SICHUAN KILOWAY TECHNOLOGIES CO., LTD., Mianyang (CN)

(72) Inventors: Junhua Mao, Mianyang (CN); Dong Zeng, Mianyang (CN)

(73) Assignee: SICHUAN KILOWAY TECHNOLOGIES CO., LTD., Mianyang (CN)

( * ) Notice: Subject to any disclaimer, the term of this patent is extended or adjusted under 35 U.S.C. 154(b) by 0 days.

(21) Appl. No.: 19/074,285

(22) Filed: Mar. 7, 2025

(65) Prior Publication Data

US 2026/0050761 A1 Feb. 19, 2026

Related U.S. Application Data

(63) Continuation-in-part of application No. PCT/CN2024/142553, filed on Dec. 26, 2024.

(30) Foreign Application Priority Data

Mar. 26, 2024 (CN) .......................... 202410347924.2

(51) Int. Cl.
*G06K 19/06* (2006.01)
*G06K 19/07* (2006.01)
*G06K 19/077* (2006.01)

(52) U.S. Cl.
CPC ... *G06K 19/07794* (2013.01); *G06K 19/0708* (2013.01); *G06K 19/0723* (2013.01); *G06K 19/07786* (2013.01)

(58) Field of Classification Search
CPC ......... G06K 19/07794; G06K 19/0708; G06K 19/0723; G06K 19/07786
See application file for complete search history.

(56) References Cited

U.S. PATENT DOCUMENTS

2008/0042846 A1* 2/2008 Jenkins ................ H01Q 9/0435
340/572.7

FOREIGN PATENT DOCUMENTS

CN 201570054 U 9/2010
CN 103218651 A 7/2013
(Continued)

OTHER PUBLICATIONS

First Office Action issued in CN202410347924.2 on May 7, 2024, and English Translation thereof.
(Continued)

*Primary Examiner* — Jamara A Franklin
(74) *Attorney, Agent, or Firm* — ARC IP Law, PC; Joseph J. Mayo

(57) ABSTRACT

A dual-carrier-powered Radio Frequency Identification (RFID) tag circuit and a data transceiving method are provided, relating to the Internet of Things (IoT) and integrated circuit technologies, and in particular, to an RFID technology. The dual-carrier-powered RFID tag circuit includes an RFID chip and an antenna, where the RFID chip includes a signal receiving connection terminal, a signal transmitting connection terminal, and a power supply connection terminal; the antenna includes a first antenna module and a second antenna module; the first antenna module and the second antenna module are independent of each other; the power supply connection terminal of the RFID chip is connected to the first antenna module; the signal transmit- (Continued)

ting connection terminal and the signal receiving connection terminal of the RFID chip are connected to the second antenna module.

8 Claims, 3 Drawing Sheets

(56)                  References Cited

FOREIGN PATENT DOCUMENTS

| | | |
|---|---|---|
| CN | 105099527 A | 11/2015 |
| CN | 105404913 A | 3/2016 |
| CN | 107528125 B | 12/2017 |
| CN | 111385776 A | 7/2020 |
| CN | 112036527 A | 12/2020 |
| CN | 113632104 A | 11/2021 |
| CN | 117952141 A | 4/2024 |

OTHER PUBLICATIONS

Second Office Action issued in CN202410347924.2 on May 27, 2024, and English Translation thereof.
International Search Report issued in PCT/CN2024/142553 on Feb. 18, 2025, and English translation thereof.

* cited by examiner

DUAL-CARRIER-POWERED RFID TAG CIRCUIT AND DATA TRANSCEIVING METHOD

CROSS REFERENCE TO RELATED APPLICATION

The present application is a continuation-in-part of International Application No. PCT/CN2024/142553, filed on Dec. 26, 2024, which claims priority to the Chinese Patent Application No. 202410347924.2, filed with the China National Intellectual Property Administration on Mar. 26, 2024, and entitled "CARRIER-POWERED RFID TAG CIRCUIT AND DATA TRANSCEIVING METHOD", which is incorporated herein by reference in its entirety.

BACKGROUND OF THE INVENTION

Field of the Invention

The present disclosure relates to the Internet of Things (IoT) and integrated circuit technologies, and in particular, to a Radio Frequency Identification (RFID) technology.

Description of the Related Art

Active and semi-active RFID tags have chips powered separately by batteries, with the Radio Frequency (RF) port connected to an antenna responsible for communication. The drawback is that the normal operation of the chip is limited by the power and lifespan of the battery. In IoT scenarios, the cost of frequently replacing batteries is almost unacceptable.

Another existing technology is passive RFID tags, where the RF port is connected to the antenna. The antenna transmits a received carrier signal to the chip for rectification, completing the power supply and communication tasks for the chip. As shown in FIG. 1, the antenna simultaneously supplies power and performs communication, which can interfere with communication and affect the sensitivity of RFID signal transmission.

Chinese Patent No. CN113632104A provides an RFID tag with an auxiliary enhanced antenna that can improve the communication distance by combining an enhanced antenna and a small RFID tag, a conductor having an RFID tag with an auxiliary enhanced antenna, and an RFID system that includes an RFID tag with an auxiliary enhanced antenna. By adjusting the resonant frequency of the enhanced antenna and the resonant frequency of the RFID tag, as well as the coupling coefficient between the enhanced antenna and the RFID tag, the two resonant frequencies of the RFID tag with the auxiliary enhanced antenna can match two frequencies required for transmitting and receiving, thus forming an RFID tag with an auxiliary enhanced antenna.

Chinese Patent No. CN107528125B provides a system and method for compensating for interference in an RFID device. A system includes an RFID antenna structure with a fixed antenna having multiple loops, one or more additional inductive loops, and switching devices coupled to the one or more additional inductive loops. The RFID antenna structure also includes a controller configured to control the switching device to selectively switch one or more additional inductive loops to change the inductance of the fixed antenna. This addresses the issue of communication interference from the perspective of changing the inductance of the antenna.

BRIEF SUMMARY OF THE INVENTION

The technical problem to be solved by the present disclosure is to provide a low-cost, high-sensitivity dual-carrier-powered RFID tag circuit and data transceiving method.

The technical solution adopted by the present disclosure to solve the technical problem is a dual-carrier-powered RFID tag circuit, which includes an RFID chip and an antenna. The RFID chip includes a signal receiving connection terminal, a signal transmitting connection terminal, and a power supply connection terminal. The antenna includes a first antenna module and a second antenna module. The first antenna module and the second antenna module are independent of each other. The signal transmitting connection terminal and the power supply connection terminal of the RFID chip are connected to the first antenna module, and the signal transmitting connection terminal and the signal receiving connection terminal of the RFID chip are connected to the second antenna module.

The first antenna module includes at least two antenna units with different polarization directions, and the second antenna module includes at least two antenna units with different polarization directions.

Further, the first antenna module includes two antenna units with perpendicular polarization directions, and the second antenna module includes two antenna units with perpendicular polarization directions.

In the two antenna modules, a minimum operating frequency of one antenna module is higher than a maximum operating frequency of the other antenna module.

Furthermore, a center frequency of the antenna module with a higher operating frequency is denoted as f1, and a center frequency of the antenna module with a lower operating frequency is denoted as f2, where f1 and f2 satisfy the following relationship: $f1 - f2 > 40$ MHz.

The present disclosure also provides a data transceiving method of a dual-carrier-powered RFID tag circuit, including the following steps:

(1) providing power supply: obtaining, by a first antenna module, energy from radio electromagnetic waves, and supplying power to an RFID chip in a wired manner;

(2) signal receiving: receiving, by a second antenna module, a wireless radio frequency signal, and transmitting the wireless radio frequency signal to the RFID chip in a wired manner; and (3) signal transmitting: emitting, by the RFID chip, a signal through the second antenna module.

Further, in the signal transmitting step, the signal emitted by the RFID chip is realized through both the second antenna module and the first antenna module.

The present disclosure has the following beneficial effects: The present disclosure solves the interference problem between the power supply function and communication function of passive RFID systems at a low cost. The present disclosure separates the two antenna modules, with the signal receiving function of the chip independently undertaken by one antenna module that is stripped of the power supply function; the signal transmitting function can be completed solely by the other antenna module or jointly by both antenna modules. In this case, the chip has a better signal transmitting effect.

BRIEF DESCRIPTION OF THE DRAWINGS

To describe the technical solutions in the embodiments of the present disclosure or in the prior art more clearly, the following briefly describes the accompanying drawings required for the embodiments. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE INVENTION

The technical solutions in the embodiments of the present disclosure are clearly and completely described below with reference to the drawings in the embodiments of the present disclosure. Apparently, the described embodiments are only some rather than all of the embodiments of the present disclosure. All other embodiments obtained by a person of ordinary skill in the art based on the embodiments of the utility model without creative efforts shall fall within the protection scope of the present disclosure.

Embodiment 1

Figure 1:
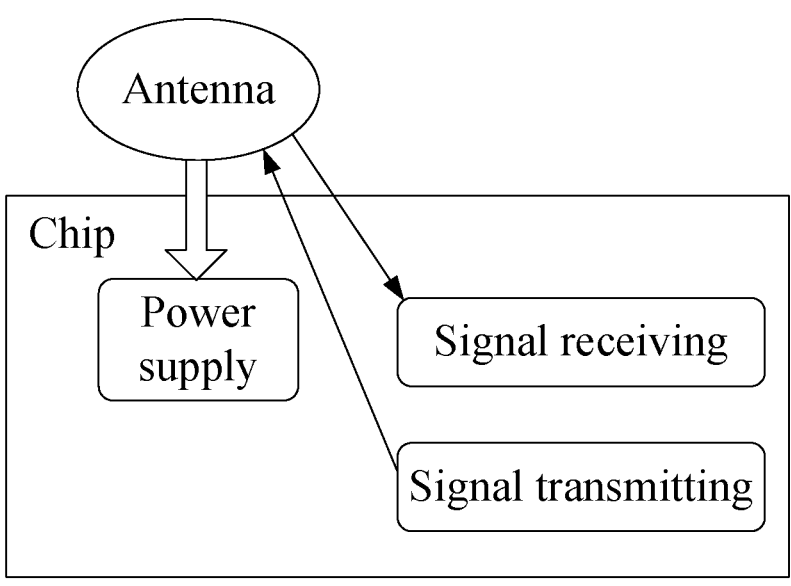
FIG. 1 is a schematic structural diagram of the prior art.
Figure 2:
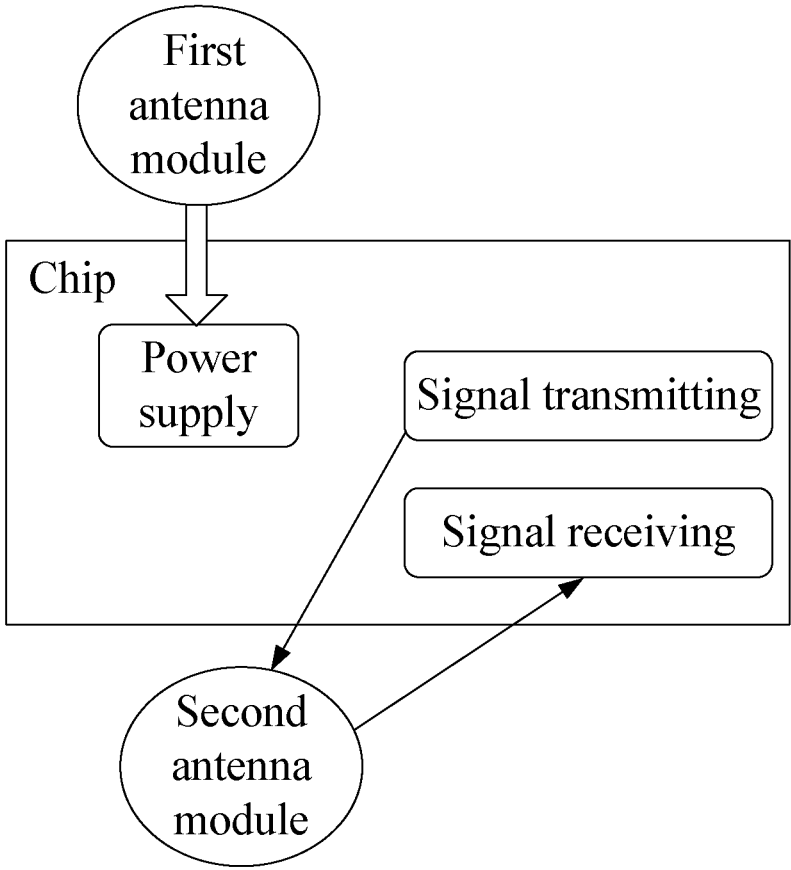
FIG. 2 is a schematic structural diagram of a dual-carrier-powered RFID tag circuit according to Embodiment 1 of the present disclosure.

Referring to FIG. 2, this embodiment has two independent antenna modules: a first antenna module and a second antenna module. The main function of the first antenna module is to supply power to the chip, and the first antenna module is connected to a power supply part of the chip. The second antenna module serves as a communication antenna for the chip, and is connected to a communication interface of the chip.

The second antenna module includes two antenna units, providing rectification and demodulation input for two polarization directions, as well as reflection modulation output for two polarization directions. The two polarization directions can be considered as two orthogonal dipole antennas.

In this embodiment, the first antenna module and the second antenna module are functionally independent of each other. The first antenna module is isolated from a radio frequency communication part of the chip, avoiding interference from the power supply part to the communication part.

Embodiment 2

Figure 3:
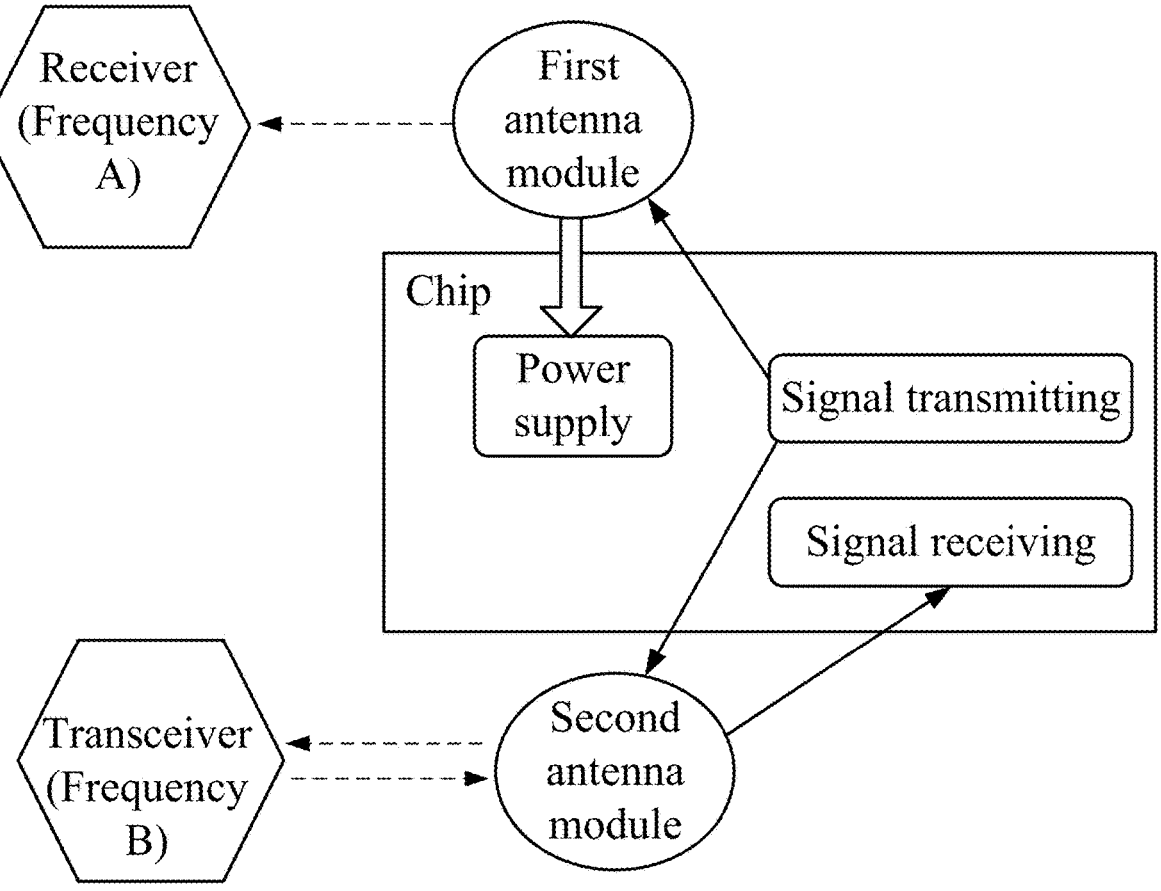
FIG. 3 is a schematic structural diagram of a dual-carrier-powered RFID tag circuit according to Embodiment 2 of the present disclosure.

Referring to FIG. 3 (dashed arrows indicate wireless communication signals, solid arrows indicate wired connections), this embodiment includes two independent antenna modules: a first antenna module and a second antenna module. The main function of the first antenna module is to supply power to the chip, and the first antenna module is connected to a power supply part of the chip. At the same time, the first antenna module is also connected to a signal transmitting unit of the chip, serving as an auxiliary for the chip to send signals externally.

The second antenna module serves as a communication antenna for the chip, and is connected to a communication interface of the chip; both the signal transmitting unit and signal receiving unit of the chip are connected to the second antenna module.

Similarly, the second antenna module in this embodiment also includes two antenna units, providing rectification and demodulation input for two polarization directions, as well as reflection modulation output for two polarization directions. The two polarization directions can be considered as two orthogonal dipole antennas.

In this embodiment, the operating frequency of the first antenna module is different from that of the second antenna module. Preferably, there should be a sufficiently large gap between the operating frequencies of the two antenna modules. Here, the operating frequency of the first antenna module is denoted as frequency A, and the operating frequency of the second antenna module is denoted as frequency B.

In the usage scenario of this embodiment, in addition to the reader communicating with the second antenna, external devices can also include a highly sensitive receiver to monitor frequency A, serving as a supplement to the second antenna module. Although the external device does not send signals to the chip via frequency A, the first antenna module can reflect and modulate the carrier of frequency A, which is beneficial for improving the communication effect.

Embodiment 3

Figure 4:
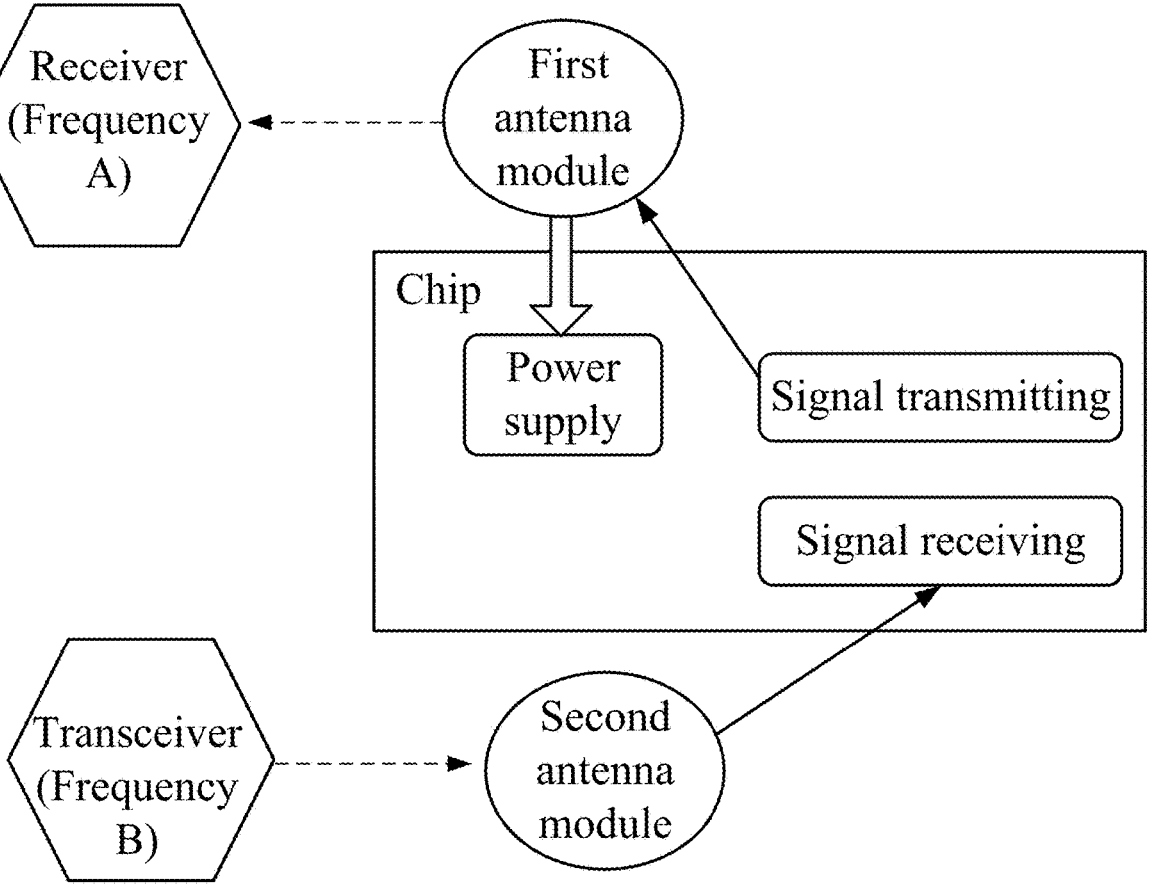
FIG. 4 is a schematic structural diagram of a dual-carrier-powered RFID tag circuit according to Embodiment 3 of the present disclosure.

Referring to FIG. 4, this embodiment divides the antenna from the perspective of signal transmission and reception. The first antenna module is configured to supply power and transmit signals, while the second antenna module is only configured to receive signals. Since the interference from the power supply part mainly affects the reception at the RFID tag end (the chip has limited space and lower anti-interference capability than external devices), the second antenna module in this embodiment is dedicated to receiving signals at frequency B. Thus, the RFID tag transmits signals and collects electrical energy at frequency A, and receives signals at frequency B, providing better anti-interference performance.

To make the above objectives, features, and advantages of the present disclosure more obvious and easy to understand, the present disclosure will be further described in detail with reference to the accompanying drawings and specific implementations.

Each embodiment in the description is described in a progressive mode, each embodiment focuses on differences from other embodiments, and references can be made to each other for the same and similar parts between embodiments.

Several examples are used herein for illustration of the principles and implementations of this application. The description of the foregoing examples is used to help illustrate the method of this application and the core principles thereof. In addition, those of ordinary skill in the art can make various modifications in terms of specific implementations and scope of application in accordance with the teachings of this application. In conclusion, the content of the present specification shall not be construed as a limitation to this application.

What is claimed is:

1. A dual-carrier-powered Radio Frequency Identification (RFID) tag circuit, comprising an RFID chip and an antenna, wherein the RFID chip comprises a signal receiving connection terminal, a signal transmitting connection terminal, and a power supply connection terminal; the antenna comprises a first antenna module and a second antenna module; the first antenna module and the second antenna module are independent of each other; the power supply connection terminal of the RFID chip is connected to the first antenna module; the signal transmitting connection terminal and the signal receiving connection terminal of the RFID chip are connected to the second antenna module.

2. The dual-carrier-powered RFID tag circuit according to claim 1, wherein the signal transmitting connection terminal of the RFID chip is also connected to the first antenna module.

3. The dual-carrier-powered RFID tag circuit according to claim 1, wherein the first antenna module comprises at least two antenna units with different polarization directions, and the second antenna module comprises at least two antenna units with different polarization directions.

4. The dual-carrier-powered RFID tag circuit according to claim 1, wherein the first antenna module comprises two antenna units with perpendicular polarization directions, and the second antenna module comprises two antenna units with perpendicular polarization directions.

5. The dual-carrier-powered RFID tag circuit according to claim 1, wherein in the first antenna module and in the second antenna module, a minimum operating frequency of one antenna module of the first antenna module and the second antenna module is higher than a maximum operating frequency of another antenna module of the first antenna module and the second antenna module.

6. The dual-carrier-powered RFID tag circuit according to claim 5, wherein a center frequency of the one antenna module with a higher operating frequency is denoted as f1, and a center frequency of the another antenna module with a lower operating frequency is denoted as f2, wherein f1 and f2 satisfy a relationship of: f1−f2>40 MHz.

7. A data transceiving method of a dual-carrier-powered Radio Frequency Identification (RFID) tag circuit, comprising an RFID chip and an antenna, wherein the RFID chip comprises a signal receiving connection terminal, a signal transmitting connection terminal, and a power supply connection terminal; the antenna comprises a first antenna module and a second antenna module; the first antenna module and the second antenna module are independent of each other; the power supply connection terminal of the RFID chip is connected to the first antenna module; the signal transmitting connection terminal and the signal receiving connection terminal of the RFID chip are connected to the second antenna module, and the data transceiving method of the dual-carrier-powered RFID tag circuit comprises:

providing power supply, comprising obtaining, by the first antenna module, energy from radio electromagnetic waves, and supplying power to the RFID chip;

signal receiving, comprising receiving, by the second antenna module, a wireless radio frequency signal, and transmitting the wireless radio frequency signal to the RFID chip; and signal transmitting, comprising emitting, by the RFID chip, a signal through the second antenna module.

8. The data transceiving method of a dual-carrier-powered RFID tag circuit according to claim 7, wherein during the signal transmitting, the signal emitted by the RFID chip is realized through both the second antenna module and the first antenna module.

* * * * *